United States Patent [19]
Laks

[11] 3,792,317
[45] Feb. 12, 1974

[54] ELECTRICAL REGULATING SYSTEM
[76] Inventor: Maurice Laks, 61, Avenue Henri Barbusse, Gagny, France
[22] Filed: Dec. 18, 1972
[21] Appl. No.: 316,040

[30] Foreign Application Priority Data
Dec. 20, 1971 France .............................. 7145692

[52] U.S. Cl. ................. 317/157, 318/609, 340/222, 417/7
[51] Int. Cl. .......................................... G05b 13/02
[58] Field of Search ...... 317/157; 318/12, 103, 256, 318/609, 610, 481; 417/7, 28; 307/39, 41; 340/222, 419

[56] References Cited
UNITED STATES PATENTS
2,888,875  6/1959  Buck..................................... 417/7
2,486,256  10/1949  Buck..................................... 417/7

Primary Examiner—J. D. Miller
Assistant Examiner—Harry E. Moose, Jr.
Attorney, Agent, or Firm—Flynn & Frishauf

[57] ABSTRACT

An electrical regulating system which enables $n$ energy-generating units to be put into and taken out of service in dependence upon variations in a physical value, with permutation of these units, this system comprising an apparatus for controlling the aforementioned value combined with a double-pole contactor with three positions, one of which is a neutral intermediate position, so as to close a first circuit when the aforementioned value exceeds a predetermined upper limit, and to close a second circuit when the value falls below a predetermined limit, distinguished by the fact that it comprises a first relay and a second relay whose windings are incorporated in the first circuit and in the second circuit, respectively, and a programmer with $n$ cams driven integrally by a single motor, these cams, associated with as many contact sets, becoming operative one after the other for positions of the programmer staggered angularly by $360°/n$, each of them only remaining operative during an angular displacement of less than this value, and further by the fact that each relay comprises a contact which, when the winding of this relay is excited, causes the motor of the programmer to be fed with current, and a set of $n$ contacts respectively associated with the various units and combined in such a way that, with those of the programmer, they control the entry into service of the aforementioned units, in the case of the second relay, and their removal from service in the case of the first relay.

4 Claims, 5 Drawing Figures

3,792,317

ELECTRICAL REGULATING SYSTEM

FIELD OF THE INVENTION

This invention relates to an electrical regulating system for automating functions and for permutating the entry into and removal from service of several energy-generating units according to requirements.

DEFINITION

In the context of the invention, an energy-generating unit is any type of unit which is powered by electricity and which is capable of supplying energy, whether in the form of heat (for example a simple electrical resistance or any other more complex heat-generating unit), cold (for example refrigeration units), hydraulic or pneumatic energy (for example pumps for pumping water or air or even ventilating fans), or any other form of energy.

PRIOR ART

In industrial installations of various kinds, whether for pumping fluids, for generating heat or cold, for pumping air or for any other form of production or distribution, energy is often supplied by several, optionally identical units which are used complementally to one another. For example, an installation for industrial refrigeration generally comprises several independent production units which, according to requirements, are brought into or taken out of service one by one under the control of one or more elements controlling a physical value, for example temperature or pressure, which are directly adapted to the load or to the requirements of the installation. In this same example of an industrial refrigeration plant, several independent units can be replaced by a single unit comprising several working stages which, in this case, too, are used complementally to one another and which can be brought into or taken out of service one by one according to requirements.

It is known that a control apparatus for each working unit, i.e., as many control apparatus as there are working units, can be used to automate functions in this way. For example, a pressure controller based on an electrical pump is used in a pumping installation which comprises several parallel pumps and in which it is desired to keep pressure as constant as possible in the event of variations in output. In another known solution, a single control element is used, varying a resistance across a Wheatstone bridge and acting on a cam programmer through a resistance-compensated balance relay. The cam of the programmer brings into or removes from service the various working units through a contact with which it is associated. It has also been proposed (U.S. Pat. No. 1,931,771) to use, as the single control element, a double-pole three-position contactor which, in its end positions, closes the circuit of either of two relays which, in turn, control the rotation in either direction of a cam programmer which successively puts the various units into or out of service according to a predetermined sequence.

However, permutation of the units, namely their use in rotation, has hitherto mostly been ignored or carried out manually. In certain very isolated instances, however, permutation has been achieved through a clock which controls the working hours of each unit and which effects a random permutation of the units after a predetermined time.

Another disadvantage attending the known electrical regulating systems referred to above is that the physical value which is controlled or "scanned" by the control element(s) can vary within a relatively wide range. In cases where each unit is provided with its own control element, the fact that this scale is relatively wide is obvious because staggering between the regulation of each control element is essential if the power units are to be brought into and taken out of service in succession. For example, in the case of a group of pumping units each associated with a pressure controller which closes a contact when the pressure exceeds an upper limit and another contact when the pressure falls below a lower limit, these two lower and upper limits defining a pressure range, the pressure ranges of the various pressure controllers associated with the various pumps have to be staggered relative to one another to ensure that the various pumping units are brought into or taken out of operation one by one. The range in which the pressure can vary is thus limited at its lower end by the lowest of the lower pressures of the aforementioned ranges and, at its upper end, by the highest of the higher pressures of the aforementioned ranges, with the result that, ultimately, a relatively wide range of variation is obtained for the pressure which, manifestly, constitutes a disadvantage when it is desired to keep the pressure as constant as possible in the event of variations in output. In addition, in cases where a single control element is used with a Wheatstone bridge, common to all the units, a variation in resistance between the different electrical balances is necessary, with the result that the range of variation is inevitable and relatively wide at that.

In order to obviate these disadvantages, the Applicant has already proposed (French Pat. Application Ser. No. 7140,307 filed Nov. 10, 1971) a regulating system intended in particular to regulate pressure in a water-distribution installation comprising several energy-generating units in the form of pumps mounted in parallel whose entry into and removal from service are controlled automatically in dependence upon a physical value, in this case pressure, by means of a single control element in the form of a neutral-point pressure controller controlling two programmers which control the entry into and removal from service of the various pumps in turn in dependence upon the pressure. One of the two programmers is brought into operation under the effect of the pressure controller in the event of inadequate pressure, whilst the other programmer is brought into operation when the pressure becomes excessive. An electrical regulating system of this kind is completely satisfactory from the point of view of sensitivity by virtue of the fact that the lower and upper pressure limits, fixed by the pressure controller, can be brought as close to one another as desired (very narrow pressure variation range), and from the point of view of wear and working-time distribution of the pumps (better utilisation of the pumps) by virtue of the fact that the pumps are switched by the programmers in accordance with a circular permutation. In a regulating system of this kind, however, at least one energy-generating unit (pump) always remains in service, which can be a disadvantage in cases where, when the demand for energy by the user is zero, it is useless, and in certain applications even undesirable, for one of the energy-generating units to continue generating energy. Although the regulating system described in the aforementioned Patent Application can in principle be applied to numerous cases other than the regulation of pressure in a water-distributing installation, the field of application of a system such as this is restricted by the fact that there is always at least one energy-generating unit in service.

OBJECT OF THE INVENTION

The principal object of this invention is to obviate this disadvantage by providing an electrical regulating system which, whilst showing high sensitivity and providing for effective utilisation of the energy-generating units, enables all the units to be taken out of service when the demand for energy is zero.

BRIEF SUMMARY OF THE INVENTION

To this end, the electrical regulating system according to the invention which enables $n$ energy-generating units to be brought into and taken out of service in dependence upon variations in a physical value, with permutation of these units, and which comprises an apparatus for controlling the aforementioned value combined with a double-pole contactor with three positions, one of which is a neutral intermediate position, so as to close a first circuit when the aforementioned value exceeds a predetermined upper limit, and to close a second circuit when the value falls below a predetermined limit, is distinguished by the fact that it comprises a first relay and a second relay whose windings are incorporated in the first circuit and in the second circuit, respectively, and a programmer with $n$ cams driven integrally by a single motor, these cams, associated with as many contact sets, becoming operative one after the other for positions of the programmer staggered angularly by $360°/n$, each of them only remaining operative during an angular displacement of less than this value, and further by the fact that each relay comprises a contact which, when the winding of this relay is excited, causes the motor of the programmer to be fed with current, and a set of $n$ contacts respectively associated with the various units and combine in such a way that, together with those of the programmer, they control the entry into service of the aforementioned units, in the case of the second relay, and their removal from service in the case of the first relay.

FURTHER FEATURES OF THE INVENTION

In one preferred embodiment of the electrical regulating system according to the invention, each of the units is fed by three separate circuits connected in parallel, namely a first circuit comprising, in series, a contact of the first relay which opens when the winding of this relay is excited and a holding contact which closes when the unit in question is supplied with voltage, a second circuit comprising, in series, a contact of the programmer which opens when the cam associated with it is operative and the aforementioned holding contact, and a third circuit comprising, in series, a contact of the programmer which closes when the cam associated with it is operative and a contact of the second relay which closes when the winding of this relay is excited.

BRIEF DESCRIPTION OF DRAWINGS

The invention is described in more detail in the following with reference to the accompanying drawings, wherein.

DESCRIPTION OF EMBODIMENTS

Figure 1:
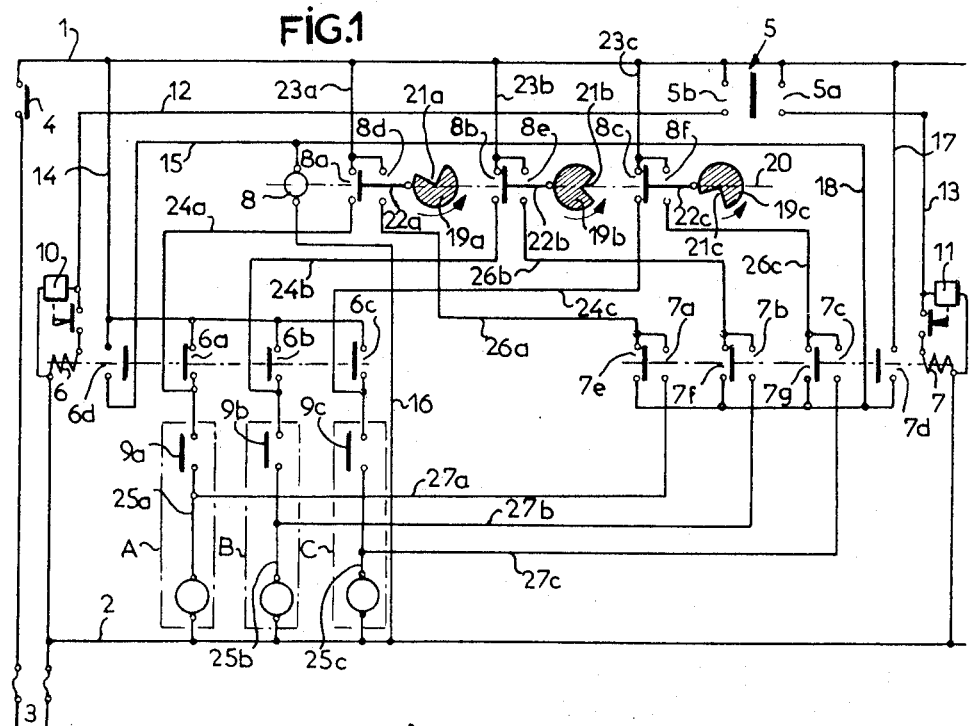
FIG. 1 is a circuit diagram of the regulating system according to the invention, the contacts being in the position which they occupy at rest.

FIG. 1 shows an electrical regulating system according to the invention designed to control the entry into and removal from service of three energy-generating units A, B and C, for example three pumps, in dependence upon variations in a physical value, for example pressure. However, this example is only being given by way of illustration because the regulating system according to the invention could be used to control any other type of unit for generating energy, whether electrical energy, hydraulic energy, pneumatic energy, heat, cold, etc., or even to control a smaller or larger number $n$ of energy-generating units.

The regulating system comprises two omnibus lines or conductors 1 and 2 fed with current at 3 through an auxiliary contactor 4. A control apparatus 5, for example a pressure controller in cases where pumps are to be controlled, which, from the electrical point of view, is in the form of a double-pole contactor with three positions, one of which is a neutral intermediate position, enables the current to flow between the lines 1 and 2 through the winding 6 of a first relay by means of a conductor 12 or through the winding 7 of a second relay by means of a conductor 13.

In addition, the regulating system comprises a programmer whose motor 8 is fed either by means of the conductors 14, 15 and 16 through the normally-open contact 6d controlled by the relay 6 or by means of the conductors 17, 18 and 16 through the normally-open contact 7d controlled by the relay 7. The programmer comprises three cams 19a, 19b and 19c keyed to a common rotating shaft 20 driven by the motor 8, when it is fed with current, in the direction indicated by the arrow. The cams 19a, 19b and 19c correspond respectively to the units A, B and C and are in the form of discs each with a notch 21a, 21b and 21c with an angle of approximately 80°, the three notches being staggered relative to one another by exactly 120°. Each cam has associated with it a reversing switch 8a–8d, 8b–8e, 8c–8f, whose moving contact is equipped with a follower 22a, 22b, 22c which is pushed elastically against the cam 21a, 21b, 21c associated with it by means of a spring (not shown). When the follower 22a, 22b, 22c is in contact with the periphery of the cam, it is the contact 8a, 8b, 8c which is closed, whereas, when the follower 22a, 22b, 22c is at the bottom of the notch 21a, 21b, 21c, the contact 8d, 8e, 8f is closed. In the first case (contact 8a, 8b, 8c closed), the reversing switch 8a–8d, 8b–8e, 8c–8f enables the unit A, B, C to be fed with current by means of the conductors 23a–24a–25a, 23b–24b–25b, 23c–24c–25c, through a self-holding contact 9a, 9b, 9c. In the second case (contact 8d, 8e, 8f closed), the aforementioned reversing switch delivers the current coming from the line 1 to a reversing switch 7a–7e, 7b–7f, 7c–7g by means of the conductors 23a–26a, 23b–26b, 23c–26c. This reversing switch 7a–7e, 7b–7f, 7c–7g is controlled by the relay 7 which, when it is at rest, closes the contacts 7e, 7f, 7g and, when it is excited, closes the contacts 7a, 7b, 7c. When they are closed, and when the contacts 8d, 8e and 8f are also closed, the contacts 7a, 7b and 7c enable the current to flow between the lines 1 and 2 respectively through the units A, B and C by means of the conductors 23a–26a–27a–25a, 23b–26b–27b–25b, 23c–26c–27c–25c. By contrast, when the contacts 7e, 7f and 7g are closed, they enable the conductors 26a, 26b and 26c to be connected together to the conductor 18 so as to form another feed circuit for the motor 8 of the programmer when one of the contacts 8d, 8e and 8f is closed. In addition, the relay 6 comprises, in addition to the normally open contact 6d, three contacts 6a, 6b and 6c which are normally closed (when the relay 6 is at rest) and which, when the self-holding contacts 9a, 9b and 9c have been previously closed, enable current to flow between the lines 1 and 2 respectively through the units A, B and C by means of the conductors 14–25a, 14–25b, 14–25c. Time switches 10 and 11, whose function will be described hereinafter, enable the supply of current to the windings 6 and 7, respectively, of the relays to be cut off after a predetermined time.

Figure 3:
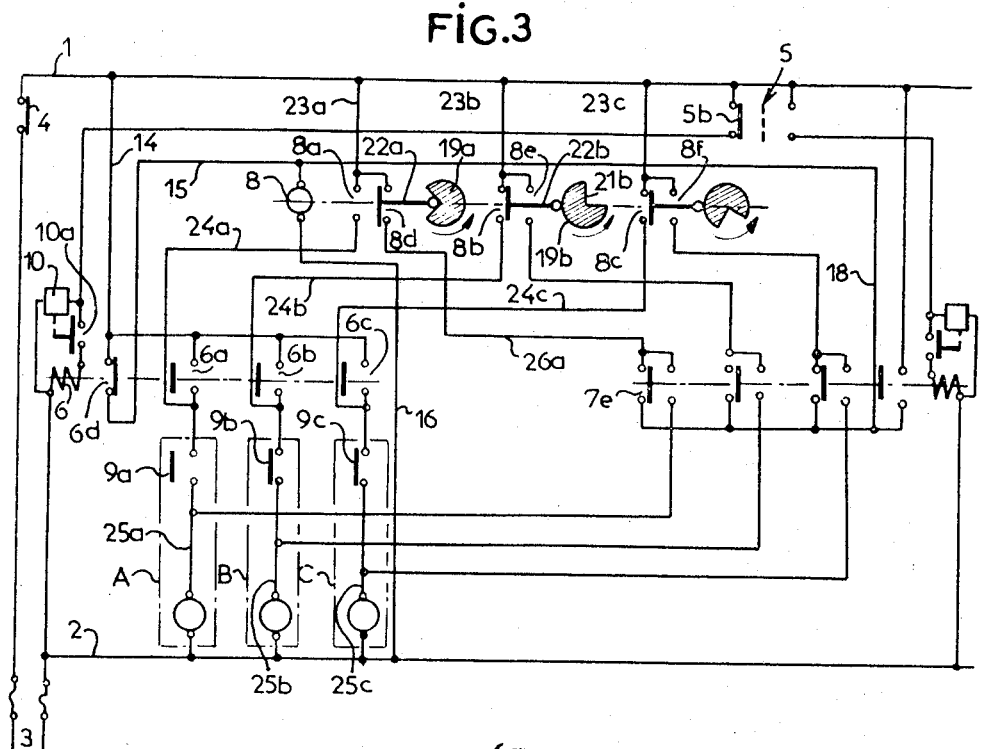
FIG. 3 again shows the same system where the physical value controlled has exceeded a predetermined upper limit.
Figure 4:
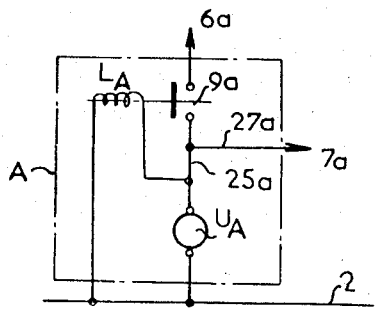
FIGS. 4 and 5 are partial views illustrating two possible ways of electrically connecting the energy-generating units.
Figure 5:
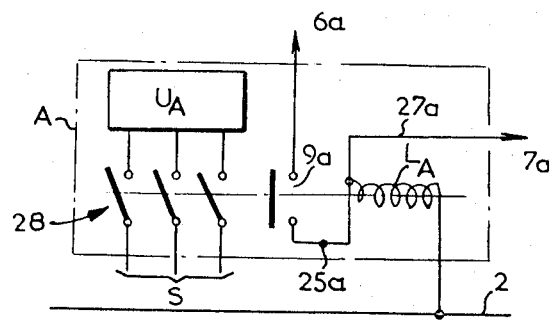

According to the applications envisaged for the regulating system described above, when the current consumed by each of the units A, B and C is negligible, these units can be directly supplied with current from the lines 1 and 2, i.e., from the feed source 3. In this case, each unit A, B and C can be electrically connected in the manner illustrated in FIG. 4 with reference to the unit A, in which it can be seen that the actual energy-generating unit $U_A$ and the control coil $L_A$ of the self-holding contact 9a are connected in parallel between the line 2 and the junction point of the conductors 25a and 27a. By contrast, when the current consumed by each of the units A, B and C is considerable, it is preferable that each of the units A, B and C should be electrically connected in the manner illustrated in FIG. 5, with reference to the unit A, in which it can be seen that the control coil $L_A$ of the self-holding contact 9a is also used when excited, to close a contactor 28 enabling the actual energy-generating unit $U_A$ to be connected to a feed source S, for example a source of three-phase current, in which case the contactor 28 is a three-pole contactor. The operation of the regulating system described above will now be described with reference to FIGS. 1, 2 and 3 of the accompanying drawings. It will be assumed, solely by way of example and for the purposes of illustration, that the units A, B and C or, more precisely, $U_A$, $U_B$, $U_C$, are pumps which, from the hydraulic point of view, are connected in parallel, and that the physical value controlled by the control apparatus 5 is the pressure at the output end of the pumps, the aforementioned control apparatus thus being in the form of a pressure controller. As already mentioned, the units A, B and C could of course be formed by any other type of energy-generating unit, and the physical value controlled could be a value other than a pressure, for example a temperature or any other similar value. In the example selected here, the pressure controller 5 is designed to close the contact 5a (FIG. 2) when the pressure falls below a predetermined lower limit, and to close the contact 5b (FIG. 3) when the pressure exceeds a predetermined upper limit, whereas, when the pressure is between these upper and lower limits, the moving contact of the pressure governer occupies the neutral intermediate position shown in FIG. 1. At rest, i.e., in the position shown in FIG. 1, the physical value (pressure) being between the predetermined upper and lower limits, the contacts 5a and 5b are open, with the result that the relay windings 6 and 7 are not fed with current. Accordingly, the contacts 6d and 7d are open so that the motor 8 is not fed with current. The contacts 6a, 6b and 6c of the relay 6 are closed as are the contacts 7e, 7f and 7g of the relay 7, whereas by contrast the contacts 7a, 7b and 7c of this relay 7 are open. The cams 19a, 19b and 19c of the programmer are stopped in such positions that the contacts 8a, 8b and 8c are closed, whereas the contacts 8d, 8e and 8f are open. Under these conditions, the units A, B and C are not fed with current providing the self-holding contacts 9a, 9b and 9c are open.

Figure 2:
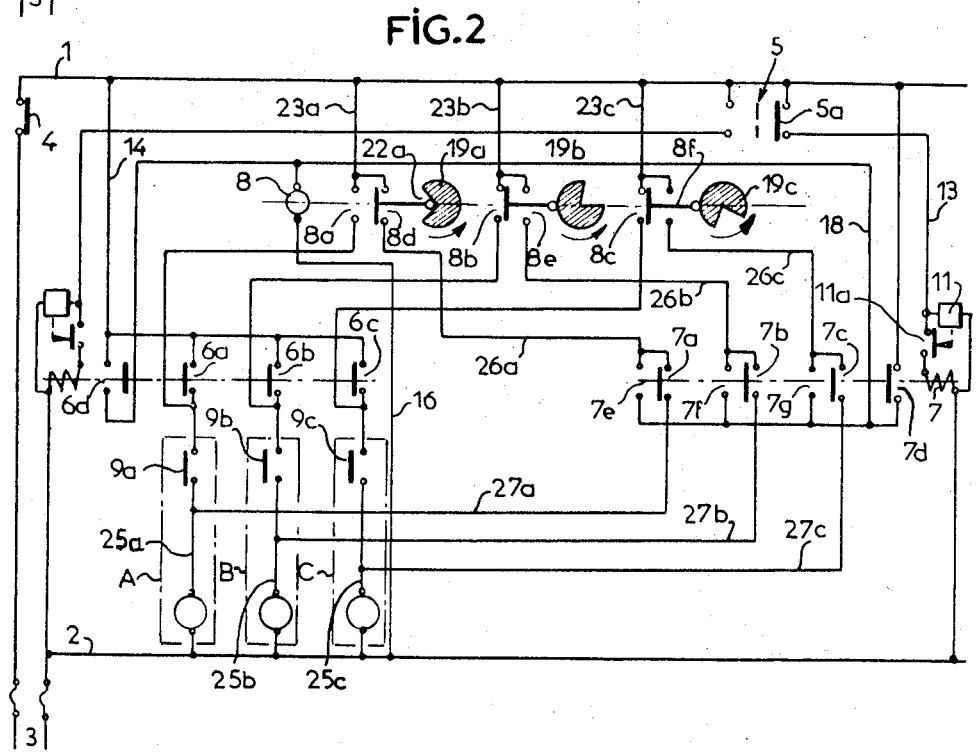
FIG. 2 shows the same system when the physical value controlled has fallen below a predetermined lower limit.

With none of the units A, B and C in service, it will now be assumed that, as the result of a demand for energy, the physical value controlled falls below the lower predetermined limit. As a result, the contact 5a closes (FIG. 2). Voltage is thus applied to the relay winding 7, with the result that the contacts 7a, 7b, 7c and 7d close, whilst the contacts 7e, 7f and 7g open. Through the contact 7d, now closed, and the conductors 17, 18 and 16, voltage is thus applied to the motor of the programmer 8 which rotates the cams in the direction of the arrow. Assuming that, at the outset, the cams occupied the position shown in FIG. 1, they arrive by rotating in the position shown in FIG. 2, closing the contact 8d which, through the closed contact 7a and by means of the conductors 23a, 26a, 27a and 25a, allows voltage to be applied to the unit A and closure of the self-holding contact 9 a. From this moment onwards, two sitations can develop. (a) Either the demand for energy is satisfied, the physical value controlled reassumes a level between the predetermined upper and lower limits, and the moving contact of the pressure controller 5 returns to its neutral intermediate position, with the result that the relay winding 7 ceases to be excited, thus opening the contacts 7a, 7b, 7c and 7d and closing the contacts 7e, 7f and 7g. Despite opening of the contact 7a, the unit A continues to be fed by means of the conductor 14, the contact 6a, the self-holding contact 9a, now closed, and the conductor 25a. In addition, while the follower 22a is in the notch 21a of the cam 19a, the motor 8 continues to be fed through the circuit 23a, 26a, 7e, 18 and 16 and will continue to be fed through this circuit as long as the contact 8d is not opened by the cam 19a. This should happen each time the moving contact of the pressure controller 5 returns to its neutral intermediate position so that the motor 8 of the programmer always stops in such a position that none of the followers 22a–22c is situated in the notch of the associated cam. (b) Or if the demand for energy is not satisfied, the contact 5a remains closed with the result that the relay winding 7 remains excited and the motor of the programmer continues to rotate. During rotation of the motor, the cam 19a causes the contact 8d to open but, as has already been seen, the unit A continues to be fed through the circuit 14, 6a, 9a and 25a and the follower 22b is pushed into the notch 21b of the cam 19b, thus closing the contact 8e and, hence, applying voltage to the unit B through the circuit 23b, 26b, 7b, 27b and 25b. From this moment onwards, another two situations can develop: either the demand for energy is satisfied and the moving contact of the pressure controller 5 returns to its neutral intermediate position, in which case the relay winding 7 ceases to be excited and the units A, B continue to be fed with current through the 14, 6a, 9a, 25a and 14, 6b, 9b and 25b, respectively, and the programmer 8 stops in such a position that none of the followers 22a to 22c is situated in a notch; or the demand for energy is still not satisfied and the motor 8 of the programmer continues to rotate, resulting, in the same way as for the units A and B, in the application of voltage to the unit C which, if the demand for energy is satisfied, continues to be fed with current through the circuit 14, 6c, 9c and 25c after opening of the contacts 8f and 7c. The time switch 11 comes into operation after a predetermined period, corresponding for example to one revolution of the programmer, when all the units A, B and C are in service and when, inspite of this, the demand for energy cannot be satisfied, for example in the event of overloading. In such a case, the time switch 11 opens the contact 11a with the result that the supply of current to the relay winding 7 is cut off. The contact 7d then opens and the motor 8 of the programmer stops when all the contacts 8d, 8e and 8f are open.

There now follows a description of what happens when the demand for energy decreases, in which case the physical value controlled (pressure) exceeds the predetermined upper limit. It will be assumed that, at the outset, all the units A, B and C are in service. The self-holding contacts 9a, 9b and 9c are thus closed. Under these conditions, when the contact 5b closes (FIG. 3), voltage is applied to the relay winding 6 with the result that the contact 6d and the contacts 6a, 6b and 6c open. Through closure of the contact 6d, the motor 8 is fed with current through the circuit 14, 6d, 15 and 16, with the result that this motor begins rotating in the direction of the arrow and, if the cams occupy the position shown in FIG. 1, the follower 22a drops into the notch in the cam 19a, opening the contact 8a and closing the contact 8d. Due to the fact that the contacts 6a and 8a are now open, the circuit 14, 6a, 9a and 25a and the circuit 23a, 8a, 24a, 9a and 25a, both of which fed the unit A, are now open with the result that the unit A is deprived of voltage and the self-holding contact 9a opens. By contrast, the units B and C continue to be fed through the circuits 23b, 8b, 24b, 9b, 25b and 24c, 8c, 24c, 9c, 25c, respectively. From this moment onwards, two situations can develop. Either the physical value controlled reassumes a level between the predetermined upper and lower limits, in which case the moving contact of the pressure controller 5 returns to its neutral intermediate position. The result of this is that the supply of current to the relay winding 6 is cut off, so that the contact 6d opens and the contacts 6a, 6b and 6c close. However, the motor 8 continues to be fed through the circuit 23a, 8 d, 26a, 7e, 18 and 16, until the cam 19a pushes back the follower 22a to open the contact 8d so that, as has previously been seen, the motor 8 stops in such a position that all the contacts 8a, 8b and 8c are closed. Or the physical value controlled is still beyond the predetermined upper limit, in which case the relay 6 remains excited, the motor 8 continues to rotate and it is now the notch 21b of the cam 19b which passes in front of the follower 22b, resulting in opening of the contact 8b and in closure of the contact 8e. This in turn results in cut-off of the supply of current to the unit B and, hence, in opening of the self-holding contact 9b and, subsequently, in stoppage of the motor 8 after the cam 19b, by continuing to rotate, has reopened the contact 8e and reclosed the contact 8b. After this, it is only the unit C which remains in service and another two situations can develop: either the physical value controlled reassumes a level between the predetermined upper and lower limits, in which case the moving contact of the pressure controller 5 returns to its neutral intermediate position and the relay 6 ceases to be excited; or the physical value controlled remains beyond the predetermined upper limit, in which case the supply of current to the unit C is in turn cut off in the same way as for the units A and B. If, despite cut-off of the supply of current to the unit C, the contact 5b remains closed, the time switch 10 intervenes at the end of a predetermined period, in exactly the same way as the time switch 11 before, to open the contact 10a and, hence, to cut off the supply of current to the relay winding 6. Accordingly, the contact 6d opens and the contacts 6a, 6b and 6c close, although voltage is not applied to any of the units A, B and C because the self-holding contacts 9a, 9b and 9c are open. Despite opening of the contact 6d, the motor 8 continues to rotate, as seen earlier on, as long as one of the contacts 8d, 8e and 8f remains closed, thus reclosing all the contacts 8a, 8b and 8c, after which the motor 8 stops.

As is apparent from the foregoing, it can be seen that if the demand for energy drops to zero the regulating system described above enables all the units to be taken out of service. In addition, if during a working cycle, in which the unit A for example is in service whilst the units B and C for example are out of service, the demand for energy begins to increase, the unit B will be brought into service so that the units A and B function whilst the unit C is always at a standstill. If the demand for energy then decreases, the unit A will be taken out of service so that only the unit B continues to function, the unit C remaining at a standstill. If the demand for energy then begins to increase again, the unit C will be brought into service, so that both the units B and C will function whilst the unit A will be out of service. If the demand for energy then decreases again, the unit B will be taken out of service, so that only the unit C will remain in service, and so on. It is thus possible to obtain a circular permutation of the units which are thus utilised more rationally because greater wear of one of the units by comparison with the others is thus avoided.

Naturally, the embodiment described above has been given solely by way of illustration, and numerous modifications can be made without departing from the scope of the invention. In particular, as already mentioned, the regulating system according to the invention could readily be designed to control a number of units greater or smaller than three. Thus, for a number $n$ of units, it would be necessary to provide a programmer with $n$ cams having notches staggered successively by an angle of $360°/n$ and, for the relay 6, $n$ normally closed contacts (one for each unit) plus a normally open contact for feeding the motor 8 and, for the relay 7, $n$ reversing switches (one for each unit) plus a normally open contact for feeding the motor 8.

I claim:

1. An electrical regulating system for enabling $n$ energy-generating units to be selectively put into and taken out of service in dependence on variations in a physical value, comprising:

means for controlling the said value;

a double-pole contactor having a position for closing a first circuit when the said value exceeds a predetermined limit, an intermediate neutral position and a position for closing a second circuit when the said value falls below a predetermined limit;

a first relay having a winding connected in said first circuit;

a second relay having a winding connected in said second circuit;

a programmer including $n$ cams and $n$ contact sets for operation by said cams, each cam and contact set becoming operative for successive rotations of the programmer of $360°/n$ and remaining operative for programmer rotation of less than $360°/n$;

a motor for driving the programmer;

a circuit means controlling energization of the motor, said circuit means including energization control contact means operable by the said relays; and $n$ contact sets connected in circuit with the $n$ contact sets driven by said cams and also connected in circuit with the units to be controlled, whereby said contact sets control the selective entry into service of the units with operation of one relay and removal from service thereof with operation of the other relay.

2. An electrical regulating system according to claim 1, wherein each of the units is fed by three separate circuits connected in parallel, namely a first circuit comprising, in series, a contact of the first relay which opens when the winding of this relay is excited and a holding contact which closes when the voltage is applied to the unit in question, a second circuit comprising, in series, a contact of the programmer which opens when the cam associated with it is operative and the aforementioned holding contact, and a third circuit comprising, in series, a contact of the programmer which closes when the cam associated with it is operative and a contact of the second relay which closes when the winding of this relay is excited.

3. An electrical regulating system according to claim 1, wherein a time switch is associated with each relay to stop excitation of the associated relay after a predetermined period.

4. An electrical regulating system according to claim 2, wherein a time switch is associated with each relay to stop excitation of the associated relay after a predetermined period.

* * * * *